(12) United States Patent
Gordon

(10) Patent No.: US 8,902,989 B2
(45) Date of Patent: Dec. 2, 2014

(54) DECODER SYSTEM FOR DECODING MULTI-STANDARD ENCODED VIDEO

(75) Inventor: Stephen Gordon, N. Andover, MA (US)

(73) Assignee: Broadcom Corporation, Irvine, CA (US)

( * ) Notice: Subject to any disclaimer, the term of this patent is extended or adjusted under 35 U.S.C. 154(b) by 2089 days.

(21) Appl. No.: 11/412,668

(22) Filed: Apr. 27, 2006

(65) Prior Publication Data

US 2006/0248516 A1 Nov. 2, 2006

Related U.S. Application Data

(60) Provisional application No. 60/675,144, filed on Apr. 27, 2005.

(51) Int. Cl.
*H04N 7/18* (2006.01)
*H04N 19/42* (2014.01)
*H04N 19/102* (2014.01)
*H04N 19/00* (2014.01)
*H04N 19/157* (2014.01)

(52) U.S. Cl.
CPC ....... *H04N 7/26946* (2013.01); *H04N 7/26702* (2013.01); *H04N 7/26069* (2013.01); *H04N 7/26335* (2013.01); *H04N 7/26207* (2013.01)
USPC ................................. 375/240.23; 375/240.25

(58) Field of Classification Search
CPC ........................................................ H04N 7/50
USPC ......................................... 375/240.01–240.29
See application file for complete search history.

(56) References Cited

U.S. PATENT DOCUMENTS

| | | | |
|---|---|---|---|
| 7,590,059 B2 * | 9/2009 | Gordon | 370/230 |
| 7,620,103 B2 * | 11/2009 | Cote et al. | 375/240.03 |
| 2005/0069039 A1 * | 3/2005 | Crinon | 375/240.26 |

* cited by examiner

*Primary Examiner* — Andy Rao
(74) *Attorney, Agent, or Firm* — Brinks Gilson & Lione

(57) ABSTRACT

Presented herein are a decoder system for decoding multi-standard encoded video. In one embodiment, there is presented a system for decoding video data. The system comprises an outer loop symbol interpreter and an inner loop symbol interpreter. The outer loop symbol interpreter decodes VC-1 syntax and AVC syntax, at a slice or picture level. The inner loop symbol interpreter decodes VC-1 and AVC syntax at a macroblock level.

20 Claims, 4 Drawing Sheets

DECODER SYSTEM FOR DECODING MULTI-STANDARD ENCODED VIDEO

RELATED APPLICATIONS

This application claims priority to "Decoder System for Decoding Multi-Standard Encoded Video", U.S. Provisional Application for Patent, Ser. No. 60/675,144, filed Apr. 27, 2005 by Gordon.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

There are a variety of standards for encoding and compressing video data. Among the standards are MPEG-2, the ITU-H.264 Standard (H.264) (also known as MPEG-4, Part 10, and Advanced Video Coding), and VC-1.

A decoder that is capable of decoding video data encoded with numerous standards is also capable of decoding a greater amount of video content. However, the foregoing standards have a number of differences that complicate the decoding.

The MPEG-2, H.264, and VC-1 standards have a number of differences. For example, MPEG-2 uses 2 D variable length coding while VC-1 uses 3 D Variable Length Coding, and AVC uses CABAC/CAVLC.

Additional limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in decoder system(s) for decoding a multi-standard encoded video, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

According to certain aspects of the present invention, a decoder is operable to decode video data encoded in accordance with the MPEG-2, H.264, and VC-1 standards.

Figure 1:
FIG. 1 is a block diagram of an exemplary circuit in accordance with an embodiment of the present invention.

Referring now to FIG. 1, there is illustrated a block diagram of an exemplary circuit for decoding video data in accordance with an embodiment of the present invention. The circuit comprises a first symbol interpreter 5 and a second symbol interpreter. The first symbol interpreter decodes VC-1 syntax and AVC syntax, at a slice or picture level while the second symbol interpreter 10 decodes VC-1 and AVC syntax at a macroblock level.

In certain embodiments of the present invention, the first symbol interpreter 5 can comprise an outer loop symbol interpreter.

In certain embodiments of the present invention, the second symbol interpreter 5 comprises an inner loop symbol interpreter.

In certain embodiments of the invention, the VC-1 syntax at the macroblock level can comprise coefficient syntax. In VC-1, coefficient syntax can include coefficient differentials or deltas. Thus, the second symbol interpreter 10 can include a coefficient constructor for constructing coefficients from the VC-1 syntax at the macroblock level.

In certain embodiments, the VC-1 syntax can include vector constructs. Thus, the second symbol interpreter 10 can include a vector constructor for constructing vectors from the VC-1 syntax at the macroblock level.

Additionally, both VC-1 and AVC use variable length coding. Accordingly, in certain embodiments of the present invention, the second symbol interpreter can include a variable length code engine for decoding variable length codes. Although VC-1 and AVC are used as examples, it is noted that the present invention is not limited to the foregoing standards and can include other standards, such as MPEG-2.

Figure 2:
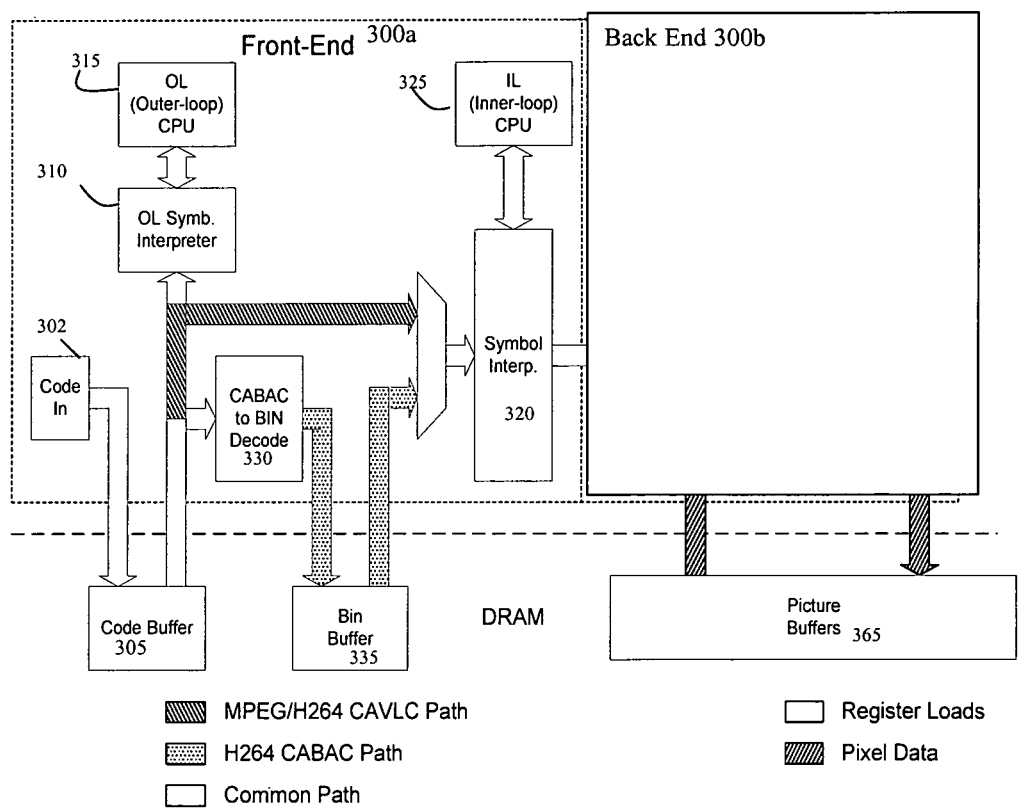
FIG. 2 is a block diagram of a video decoder in accordance with an embodiment of the present invention.

Referring now to FIG. 2, there is illustrated a block diagram describing an exemplary video decoder 300 in accordance with an embodiment of the present invention. The video decoder 300 comprises a front-end 300a and a back-end 300b. The front end 300a extracts and interprets symbols forming the received bit stream. The back end 300b reconstructs the encoded video data from the symbols.

The front end 300a includes a code-in 302 for receiving a bit stream, a video elementary stream, that can comprise MPEG-2, H.264, or VC-1 encoded data. A code buffer 305 buffers the video elementary stream. The code buffer 305 can be a portion of a memory system, such as a dynamic random access memory (DRAM).

The front end 300a comprises an outer loop symbol interpreter 310, controlled by an outer-loop CPU 315, an inner loop symbol interpreter 320 controlled by an inner loop CPU 325, and a CABAC to BIN decoder 330.

Depending on the type of encoding of the video data, MPEG-2, H.264, or VC-1, the video data proceeds through different paths. If the video is VC-1 a VLC engine in both the outer and inner loop symbol interpreters can be used. If the video is MPEG-2, a VLC engine in the inner loop is used. Where the video data is H.264, there is a VLC engine in the outer loop and a (CA)VLC engine in the inner loop. In addition, there is a CABAC engine 330 whose input is controlled by the outer loop and whose output (BINS) are output to a buffer that is consumed by the inner loop. The BINS are in a compressed format that is further decompressed by the inner loop VLC engine. Additionally, in all three protocols, there is a slice descriptor buffer that the outer loop fills in and is consumed by the inner loop prior to decoding the macroblocks in the slice.

The outer loop symbol interpreter 310 supports VC-1 decoding of picture header syntax elements, while the inner loop symbol interpreter 320 supports variable length decoding for macroblock and block level syntax elements, vector construction, including motion vector calculation with pullback and hybrid prediction, and coefficient prediction for VC-1 encoded video data.

The symbol interpreter 320 provides the sets of scanned quantized frequency coefficients to an inverse scanner, quantizer, and transformer (ISQT) 325. Depending on the prediction mode for the macroblock associated with the scanned quantized frequency coefficients, the symbol interpreter 320 provides the side information to either a spatial predictor 345 (if spatial prediction) or a motion compensator 350 (if temporal prediction).

The backend 300b of the decoder writes decodeds macroblock 120 to the picture buffer 365.

The outer loop symbol interpreter 310, the inner loop symbol interpreter 320, the CABAC to BIN decoder 330, and the code-in 302 can be hardware accelerators under the control of a central processing unit (CPU). The outer loop feeds bits to the CABAC decoder. CABAC outputs BINS are then consumed by the inner loop.

Figure 3:
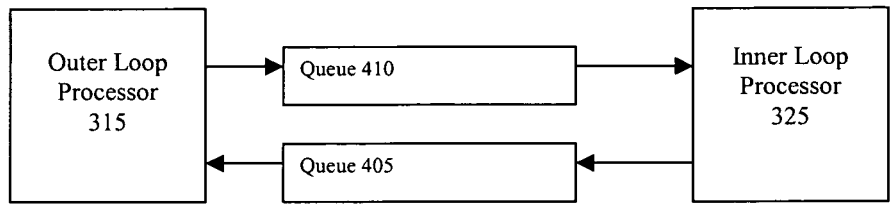
FIG. 3 is a block diagram describing an outer loop symbol interpreter and inner loop symbol interpreter interface in accordance with an embodiment of the present invention.

Referring now to FIG. 3, there is illustrated a block diagram describing an exemplary interface between the outer loop processor 315 and the inner loop processor 325. The interface comprises a first queue 405 and a second queue 410. The inner loop processor 325 and the outer loop processor 315 communication with each other at picture and slice boundaries. The outer loop processor 315 places the elements onto the queue for the inner loop processor 325. The elements can include picture type (I,P,B), true picture width and length, coded picture width and length, a pointer to bit plane data, a pointer to the slice structures in the memory, and the length of the slice data.

According to certain embodiment of the present invention, the elements can also include, for example, an indicator indicating, for example, whether the video data is H.264, MPEG-2, or VC-1, and a channel context. Responsive to receiving the elements from the first queue 405, the inner loop processor 325 decodes the slice structures. The inner loop processor 325 places the elements on the second queue 410. The elements include an identifier identifying pictures, when the inner loop processor 325 has finished decoding all of the slices of the picture.

Figure 4:
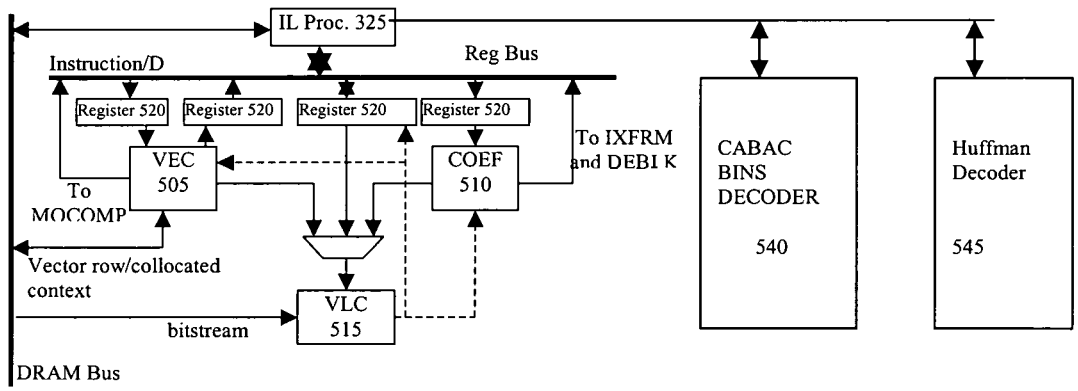
FIG. 4 is a block diagram of an exemplary inner loop symbol interpreter in accordance with an embodiment of the present invention.

Referring now to FIG. 4, there is illustrated a block diagram describing certain aspects of an inner loop symbol interpreter in accordance with an embodiment of the present invention. The inner loop symbol interpreter 320 comprises a vector constructor 505, a coefficient constructor 510, and a variable length code engine 515. The diagram is not intended to be exhaustive, and for purposes of clarity, certain elements are omitted.

The inner loop processor 325 sequences the macroblock decoding process by decoding the macroblock header information. If the video data is MPEG-2 encoded, the inner loop processor 325 provides the video data to the Huffman decoder 545. If the video data is H.264 encoded, with CABAC, the inner loop processor 325 provides the BINs to a CABAC BINS decoder 540. If the video data is VC-1 encoded, the inner loop processor 325 passes control to the vector constructor 505 for vector decode, passes control to the coefficient constructor 510 for coefficient decode, and then signaling the backend hardware that the macroblock is ready for conversion to YUV output, via registers 520. The VLC engine 515 is equipped with VC-1 variable length code tables.

Figure 5:
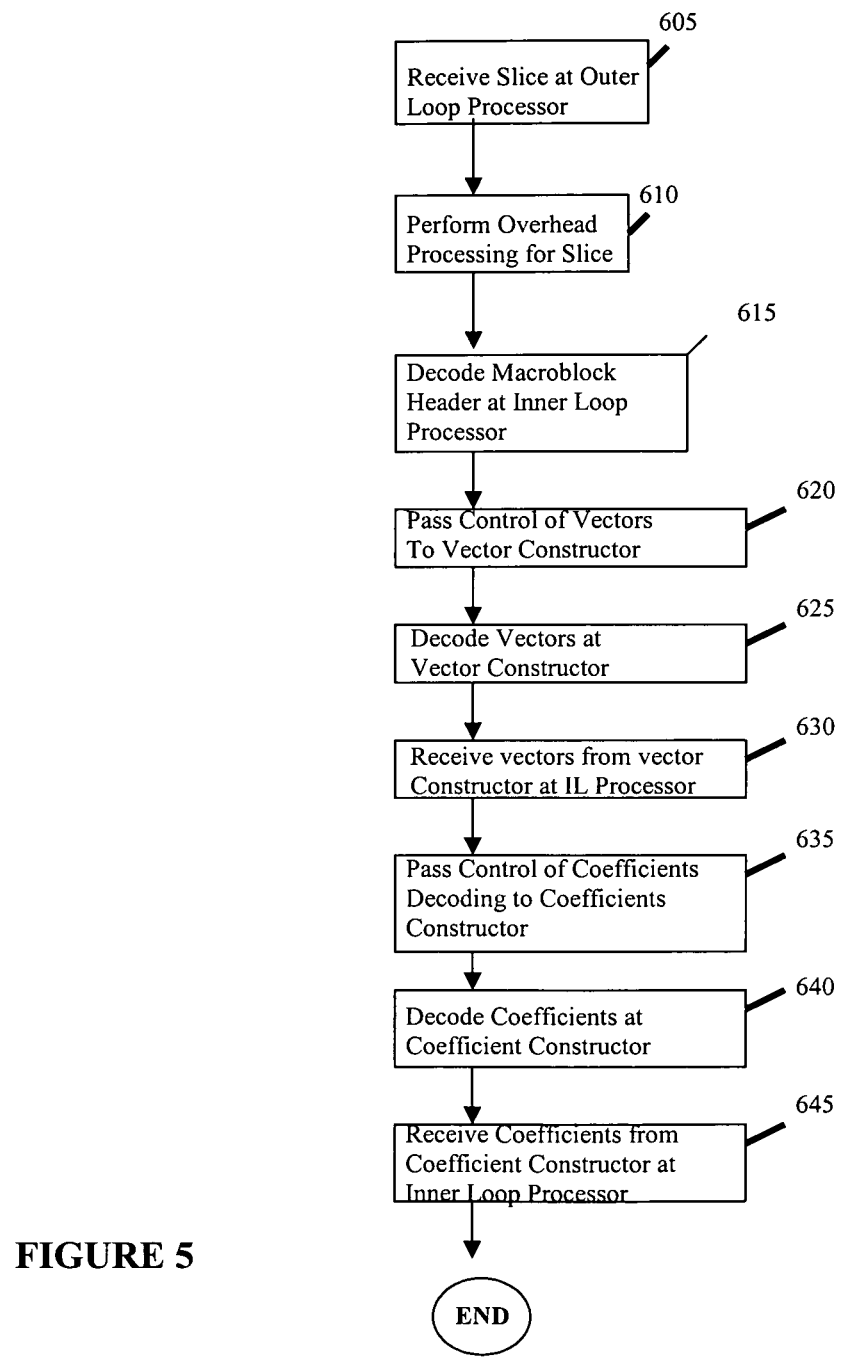
FIG. 5 is a flow diagram for decoding video data in accordance with an embodiment of the present invention.

Referring now to FIG. 5, there is illustrated a flow diagram for decoding video data in accordance with an embodiment of the present invention. At 605, a slice is received at the outer loop processor 315. At 610, the outer loop processor performs the overhead processor for the slice. The inner loop processor 320 decodes the macroblock header at 615, and passes control of the vectors to the vector constructor 505 at 620. At 625, the vector constructor 505 decodes the vectors. At 630, the inner loop processor 320 receives the vectors from the vector constructor 505. At 635, the inner loop processor 320 passes control of coefficients decoding to the coefficient constructor 510. At 640, the coefficients constructor 510 decodes the coefficients and provides the coefficients to the inner loop processor 320 at 645.

The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on VC-1, H.264, and MPEG-2 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A system for decoding video data, said system comprising:
   a first symbol interpreter for decoding VC-1 syntax and AVC syntax, at a slice or picture level, the first symbol interpreter determining descriptor data including at least one of a picture type, a picture length, a picture width, a pointer to bit plane data, a pointer to a slice structure, or a length of slice data; and
   a second symbol interpreter for decoding VC-1 and AVC syntax at a macroblock level in response to the descriptor data, the second symbol interpreter including a coefficient constructor for constructing coefficients from the VC-1 syntax at the macroblock level or a vector constructor for constructing vectors from the VC-1 syntax at the macroblock level.

2. The system of claim 1, wherein the second symbol interpreter comprises:

a coefficient constructor for constructing coefficients from the VC-1 syntax at the macroblock level.

3. The system of claim 1, wherein the second symbol interpreter comprises:
a vector constructor for constructing vectors from the VC-1 syntax at the macroblock level.

4. The system of claim 1, wherein the second symbol interpreter comprises:
variable length code engine for decoding variable length codes.

5. The system of claim 1, wherein the first symbol interpreter comprises an outer loop symbol interpreter.

6. The system of claim 1, wherein the second symbol interpreter comprises an inner loop symbol interpreter.

7. A method for decoding video data, said method comprising:
decoding VC-1 syntax and MPEG-2 syntax, at a slice or picture level at first symbol interpreter in an outer loop, the decoding at a slice or picture level comprising determining descriptor data including at least one of a picture type, a picture length, a picture width, a pointer to bit plane data, a pointer to a slice structure, or a length of slice data;
decoding VC-1 at a macroblock level at a second symbol interpreter in an inner loop, wherein the decoding VC-1 syntax at the macroblock level comprises constructing coefficients from the VC-1 syntax or constructing vectors from the VC-1 syntax;
decoding MPEG-2 at the macroblock level at the second symbol interpreter in the inner loop.

8. The method of claim 7, wherein decoding VC-1 syntax at the macroblock level comprises:
constructing coefficients from the VC-1 syntax at the macroblock level at a coefficient constructor.

9. The method of claim 7, wherein the decoding VC-1 syntax at the macroblock level comprises:
constructing vectors from the VC-1 syntax at the macroblock level at a vector constructor.

10. The method of claim 7, wherein the decoding VC-1 syntax at the macroblock level further comprises:
variable length code engine for decoding variable length codes.

11. A system for decoding video data, said system comprising:
a first symbol interpreter for decoding variable length coded symbols encoded in accordance with VC-1 syntax and variable length coded symbols encoded in accordance with AVC syntax at a slice or picture level, the first symbol interpreter determining descriptor data including at least one of a picture type, a picture length, a picture width, a pointer to bit plane data, a pointer to a slice structure, or a length of slice data; and
a second symbol interpreter for decoding variable length coded symbols encoded in accordance with VC-1 syntax and variable length coded symbols encoded in accordance with AVC syntax at a macroblock level, the second symbol interpreter including a coefficient constructor for constructing coefficients from the VC-1 syntax at the macroblock level or a vector constructor for constructing vectors from the VC-1 syntax at the macroblock level.

12. The system of claim 11, wherein decoding variable length coded symbols encoded in accordance with VC-1 syntax and variable length coded symbols encoded in accordance with AVC syntax at a slice or picture level comprises decoding picture header syntax elements.

13. The system of claim 11, wherein the decoding variable length coded symbols encoded in accordance with AVC syntax at a macroblock level comprises decoding CABAC coded symbols.

14. The system of claim 12, wherein the first symbol interpreter provides decoded picture header syntax elements to the second symbol interpreter, wherein the second symbol interpreter uses the picture header syntax elements to decode the variable length coded symbols encoded in accordance with VC-1 syntax and the variable length coded symbols encoded in accordance with AVC syntax at a macroblock level.

15. The system of claim 11, wherein the second symbol interpreter comprises:
a vector constructor for constructing vectors from the VC-1 syntax at the macroblock level.

16. The system of claim 11, wherein the second symbol interpreter comprises:
variable length code engine for decoding variable length codes.

17. The system of claim 1, wherein the first symbol interpreter provides decoded picture header syntax elements to the second symbol interpreter, wherein the second symbol interpreter uses the picture header syntax elements to decode the variable length coded symbols encoded in accordance with VC-1 syntax and the variable length coded symbols encoded in accordance with AVC syntax at a macroblock level.

18. The method of claim 7, further comprising:
providing decoded picture header syntax elements from the first symbol interpreter to the second symbol interpreter, wherein the second symbol interpreter uses the picture header syntax elements to decode the variable length coded symbols encoded in accordance with VC-1 syntax and the variable length coded symbols encoded in accordance with AVC syntax at a macroblock level.

19. The system of claim 1, further comprising:
a slice descriptor buffer, the first symbol interpreter filling the slice descriptor buffer and the second symbol interpreter consuming the slice descriptor buffer prior to decoding macroblocks in the slice.

20. The method of claim 7, further comprising:
filling a slice descriptor buffer of a slice in the outer loop and the consuming the slice descriptor buffer prior to decoding macroblocks of the slice in the inner loop.

* * * * *